United States Patent [11] 3,615,680

| [72] | Inventors | Richard Grant Henika<br>Alamo;<br>John C. Colmey, Diablo; Marlene R.<br>Henselman, Pleasanton, all of Calif. |
|---|---|---|
| [21] | Appl. No. | 776,884 |
| [22] | Filed | Nov. 19, 1968 |
| [45] | Patented | Oct. 26, 1971 |
| [73] | Assignee | Foremost-McKesson, Inc.<br>San Francisco, Calif. |

[54] HOME BAKING PROCESS
14 Claims, 2 Drawing Figs.

[52] U.S. Cl. ................................................ 99/90 R,
99/91
[51] Int. Cl. ............................................. A21d 2/28,
A21d 2/04, A21d 8/02
[50] Field of Search ............................................. 99/90, 90
CB, 91, 90 NF

[56] References Cited
UNITED STATES PATENTS
2,903,361  9/1959  Marks et al. .................. 99/91 X
3,053,666  9/1962  Henika et al. .................. 99/90

Primary Examiner—Raymond N. Jones
Assistant Examiner—James R. Hoffman
Attorney—Flehr, Hohbach, Test, Albritton and Herbert ABSTRACT: A home process for making leavened bread, rolls, buns, sweet goods, in a relatively short period of time, with minimal requirements for working and kneading of the dough, and with a high degree of tolerance to processing errors. Baked produces can be satisfactorily produced in less than 90 minutes, and kneaded and leavened dough is ready for proofing and baking in less than 30 minutes. The processing involves mixing of essential dough ingredients with gluten activating and maturing agents, with the activating agent being present at levels sufficient to react with substantially all of the protein in the dough to achieve desired dough viscosities in a very short mixing period, as determined by dough development and extensibility. Starch modifying agents are also used for improvement of flavor and dough properties. Slow acting oxidants or maturing agents are also advantageously employed.

INVENTORS
Richard G. Henika
John C. Colmey
BY Marlene R. Henselman
Attorneys

3,615,680

HOME BAKING PROCESS

BACKGROUND OF INVENTION

Home processes for the manufacture of bread, rolls, coffee cakes and the like, just as commercial bakery processes, depend upon a substantial fermentation period to develop essential dough properties for proper mixing, rising in the pan and baking. Fermentation with simultaneous aging of the dough also serves to develop desired properties in the baked product such as loaf volume, grain quality, texture and flavor.

As is well known, commercial or bakery bread and like products are conventionally made according to the so-called "straight dough" and "sponge dough" methods. As particularly pointed out in Henika, et al. U.S. Pat. No. 3,053,666, the straight and sponge dough methods rely on prolonged periods of fermentation (ranging from 2½ to 6 hours) to effect continuing production of carbon dioxide and to produce certain chemical and environmental changes to assist subsequently in obtaining proper development in the commercial mixer and the proper maturity during the proof and bake. In variations of such commercial processing using liquid brews, substantial periods of preliminary fermentation (i.e., ranging from 2½ to 6 hours) are similarly required to develop essential dough characteristics. It is essential in all these prior commercial processes that fermentation reactions initiated by the yeast continue throughout the subsequent processing, to ensure desired characteristics in the dough and in the baked products.

In home baking processes, fermentation reactions are likewise vital to obtaining necessary dough and bread properties, perhaps, even more so because of the inability to rely in the home upon high speed, heavy-duty mixing equipment to assist in the obtaining of highly developed, uniformly mixed doughs. Thus, conventional home baking processes call for a series of relatively prolonged mixing and dough rising steps during which the necessary fermentation reactions take place. By way of illustration, in one well-known cookbook procedure for making bread,* the dough ingredients are first mixed in a bowl, kneaded on a dough board (at least 10 minutes), placed in a bowl and allowed to rise about 1 hour (early proof) until the volume has doubled, punched, rolled, folded (2 to 3 minutes), placed in the bowl and allowed to rise another 1½ hours (intermediate proof) until the volume has again doubled, hand shaped and divided to form units for baking, placed in pans and allowed to rise for another 30 minutes or so (final proofing) to double the volume. The dough is then baked and cooled. Altogether such processes require from 3½ to 5 hours, or more, to complete. In processes described for so-called "quick" bread, a minimum of 2½ to 3 hours is still required to complete the various steps in processing.

As a practical matter, while some housewives may enjoy the "do-it-yourself" aspects of getting their hands in the dough, slapping and punching it down, waiting for it to double and then double again, the great majority of homemakers simply haven't the time or energy to carry out the presently available home baking processes. Moreover, those housewives who make the initial attempt to do so, find that the labor involved in kneading and punching the dough in the various dough working steps, and in rolling, hand shaping, flattening and folding the dough for final proof and bake, is considerably more than they had counted upon. As a result, there is a distinct need in the home for a simple, easy, effective process for producing home baked goods in substantially less time than is presently required.

SUMMARY OF INVENTION AND OBJECTS

The present invention relates generally to ready-mix or home processes for making leavened bakery products such as bread, rolls, buns, sweet goods, and the like. It additionally pertains to compositions for use in preparing doughs for such products.

As noted above, known procedures for making home bread and like bakery products are characterized by the necessity of

*Joy of Cooking, Irma S. Rombauer, pp. 468, 469.

subjecting part or all of the ingredients to prolonged fermentation and manipulation for the purpose of developing certain essential dough characteristics prior to forming the dough into individual units for baking. The present invention seeks to overcome these difficulties by employing certain biochemical activating agents at levels related to the protein in the flour, to obtain desired dough viscosities together with a rapid development of essential dough characteristics independently of prolonged periods of fermentation and arduous mixing, working and kneading steps. More specifically, the present invention is predicated on our discovery that desired results can be obtained in prepackaged bread, bun and roll mixes when the biochemical activating agents generally disclosed in Henika et al. U.S. Pat. No. 3,053,666 are employed at levels sufficiently high to react with substantially all of the proteins in the dough, to thereby provide necessary dough development and extensibility with minimal working and mixing. In addition, we have discovered that the foregoing dough and protein reactions can be supplemented by use of certain starch modifying agents, together with the reactions of certain oxidants, to achieve an optimum level of dough reactions in the absence of the more powerful, high speed mixing normally employed in commercial dough processes. Finally, we have found that the described effects are obtained to a higher degree when substantially all of the flour protein is subjected to the developing and maturing actions of the biochemical activating and oxidizing agents, in successive stages, and not simultaneously.

In general, therefore, it is an object of the present invention to provide a new, ready-mix or home process for making leavened bakery products such as bread, rolls, buns, sweet goods, and the like, in which optimum dough and product characteristics are developed in a novel manner.

Another object of the invention is to provide a novel process of the above character which greatly simplifies and shortens the home baking process, particularly as respects the time and effort required to produce desired characteristics of dough development and extensibility.

Another object of the invention is to provide a process of such character which greatly reduces the effort required of the housewife, in working and kneading the dough to a consistency satisfactory for final proof and bake.

Another object of the invention is to provide a process of the above character which provides a dough characterized by relatively short dough rising requirements, so as to make possible a substantial reduction in the time required for dough processing steps.

A further object of the invention is to provide a home baking process which is relatively simple with respect to the number of separate operations required by the housewife, and which substantially reduces the energy input required for mixing and kneading.

Another object of the invention is to provide a home baking process of such character which is capable of producing dough of desired characteristics within about 30 minutes, or less, and fully baked products within a period of less than 90 minutes.

Another object of the invention is to facilitate the making of home baked bread, buns, rolls, sweet goods and the like of very high quality.

A further object of the invention is to provide a novel composition of matter consisting of biochemical activating agents incorporated in dry whey solids, such composition having an unusually homogenous characteristic particularly adapted for the subject home baking process.

Further objects and features of the invention will appear from the following description in which the preferred embodiments have been set forth in detail in conjunction with the accompanying drawing.

DESCRIPTION OF THE PREFERRED EMBODIMENTS

Figure 1:
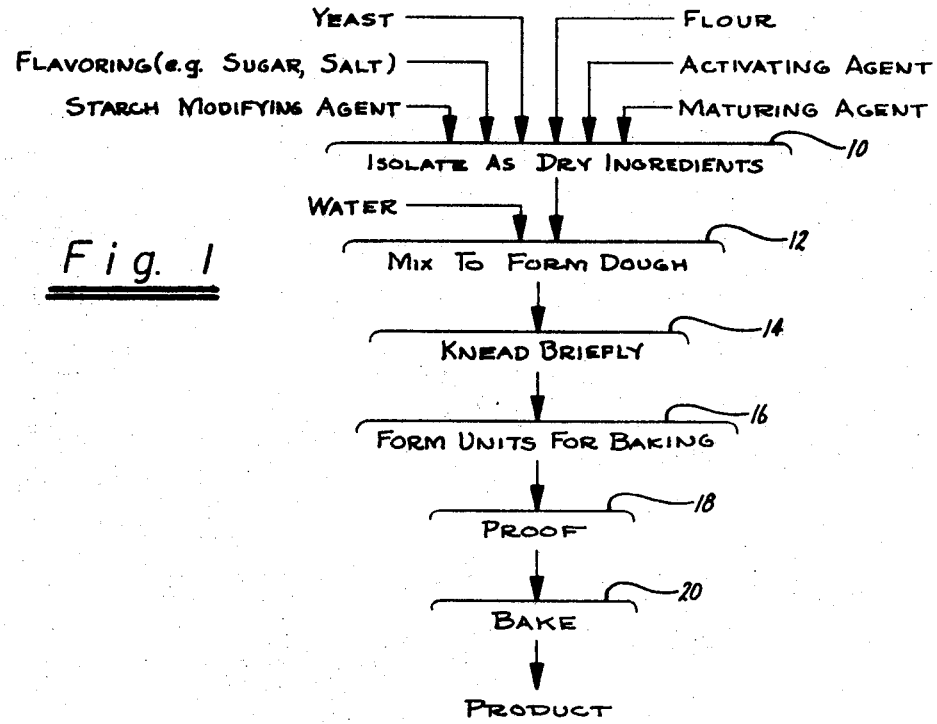
FIG. 1 is a flow sheet illustrating a ready-mix or home baking process in accordance with the present invention.

FIG. 1 illustrates one procedure for carrying out the ready-mix or home baking method of the present invention. Essential ingredients for making bakery products such as bread, rolls, or buns, are supplied in dry form to step 10 where they are isolated for subsequent use in the processing. Isolation may be accomplished by prepackaging of the dry ingredients in one or more easily opened packets. For example, the yeast may be prepackaged in one packet and the remaining dough ingredients, including the flour, sugar, stabilizers, and like ingredients in the other. The activating and maturing agents are most conveniently incorporated with the flour. According to one procedure, the activating agent is incorporated into the flour in a special homogenous, easily distributed form as part of a blend with a much larger proportion of dried cheddar whey (e.g., 0.4 percent). Starch modifying agents as hereinafter described can also be incorporated with the prepackaged flour mix, in step 10, to improve flavor and dough properties in the subsequent processing.

In step 12 all of the prepackaged dry ingredients are mixed with water to form a dough. The mixing in step 12 can be conveniently accomplished in a bowl in any of the conventional ways employed by the housewife, for example by hand or using an electric mixer. In general, the mixing is rapidly accomplished (1 to 2 minutes) and does not require any special procedures or equipment.

In step 14 the dough is kneaded in conventional manner, for example by hand on a floured board. In the process of the present invention, relatively high levels of activating agent are incorporated in the dough mix, in proportions sufficient to react with all of the protein in the flour. As a result, only relatively brief kneading periods are required, ranging from about one-half to 8 minutes, with desired dough consistencies generally being obtained in about 3 minutes or less. The dough can be kneaded in the usual manner by folding the dough over on itself and pushing downward with the palms of the hands, the operation being repeated until the dough is smooth and pliable.

In step 16, the dough is divided, as necessary, shaped, and placed in one or more baking pans. The necessity for dividing is related directly to the proportion of ingredients in the prepackaged mix and, additionally, to the particular packaging technique employed (e.g., one large packet or several small packets).

In step 18, the dough in the pan is allowed to rise in a warm place, for example, in an oven with the door cracked open, until the volume of the dough has increased to approximately double its original volume. The rising or proofing of the dough is generally accomplished in a relatively short period (e.g., 25 to 45 minutes). Proofing temperatures during this time may range from 100° to 140° F. (optimum about 110° F.). In the process of the present invention, the "proofing" or rising of the dough in step 18 constitutes the only dough expanding step necessary for satisfactory practice of the home baking process described.

In step 20 the proofed loaf is baked in conventional manner, at 375° to 425° F. for about 25 to 45 minutes, until the loaf is uniformly brown. Thereafter the baked product can be cooled by any of the procedures normally employed by the housewife.

Figure 2:
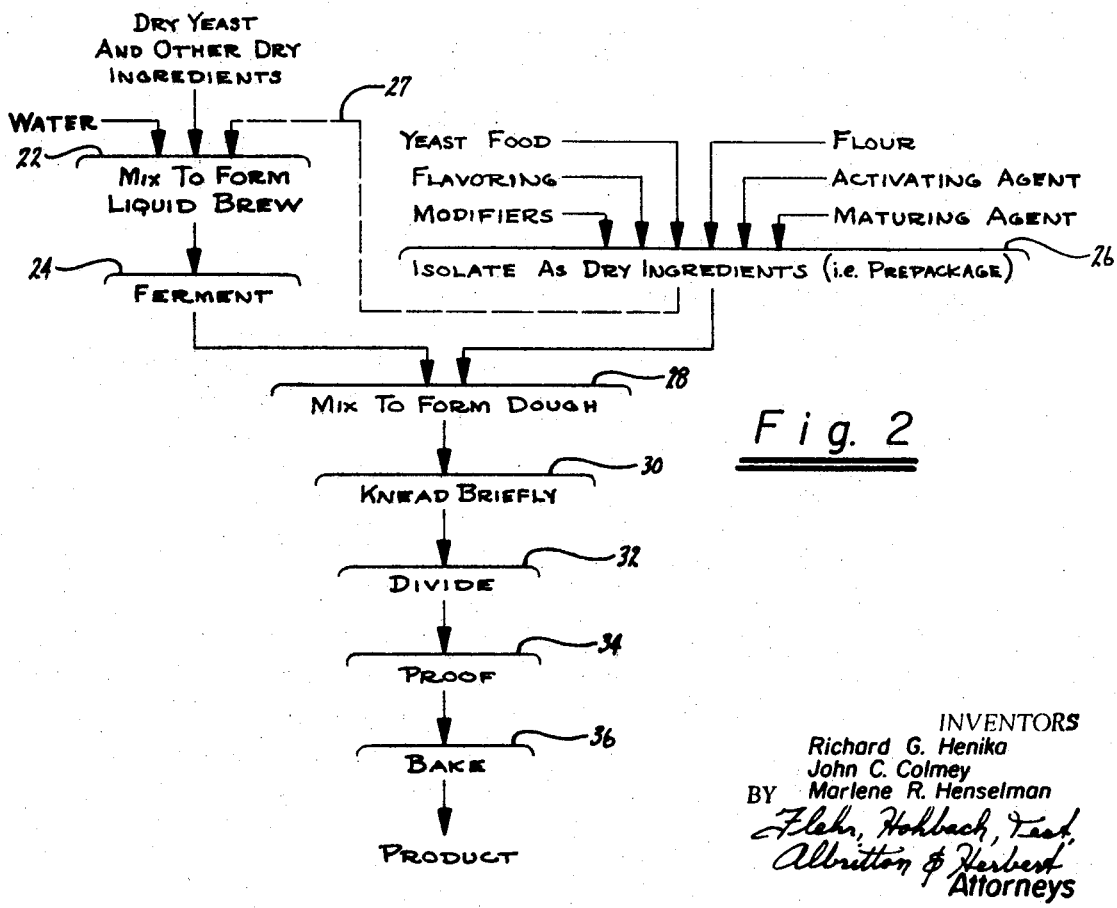
FIG. 2 is a flow sheet illustrating another embodiment of a ready-mix or home baking process in accordance with the present invention.

While the processing in FIG. 1 has been described in conjunction with a one-step mixing procedure, represented in step 12, the method of the present invention can just as easily be carried out in conjunction with a conventional brew step. Thus, FIG. 2 illustrates the use of an initial brew step 22 for purposes of forming a liquid brew which is subsequently mixed with the dry ingredients in step 28. As shown, a packet of active dry yeast can be opened and mixed with warm water (e.g., about 85° to 120° F.) and other ingredients such as sugar and/or flour, and fermented in step 24 for about 15 minutes. Thereafter the dry ingredients, separately prepackaged in step 26, can be added to the liquid brew to form a dough. As an alternative (represented by dotted line 27), a portion of the dry ingredients from step 26 can be added with the yeast and water in step 22 to form the liquid brew. In either case, the resulting dough, produced in step 28, can thereafter be briefly kneaded in step 30, divided in step 32, and proofed and baked in steps 34 and 36, in much the same fashion as previously described in conjunction with steps 14 through 20 of FIG. 1.

The foregoing processing makes possible the home baking of such products as bread, rolls, buns, sweet goods and the like in substantially less time, and with substantially less effort, than has heretofore been possible. For example, referring to FIGS. 1 and 2, bread of retail quality can be completely mixed and baked within 60 to 90 minutes from the start of mixing (in step 10 or 26) to the removal of the baked bread from the oven (in step 20 or 36). Significantly, the time required to preliminarily develop the dough (in steps 10 through 16, or 26 through 30), can be reduced to something less than 30 minutes. Also, of particular importance to the housewife, is the fact that the effort and skill required to knead and shape the loaves is significantly reduced. Of benefit to both the housewife and the manufacturer, is the fact that the described processing incorporates an unusually high degree of tolerance to housewife error and inability, particularly in the dough mixing and developing steps, so that satisfactory results in the home are almost certainly assured. These beneficial results arise not only from the elimination of prolonged holding periods previously essential to fermentation reactions, but also because the essential dough development and extensibility required in making a satisfactory loaf of bread is accomplished in processing which requires but a single dough rising or "-proofing" step in the overall processing (step 18 or 34, in FIGS. 1 and 2).

As activating agents in the above described processing, we employ one or more compounds selected from the group consisting of cysteine, glutathione and sulfite reducing salts, specifically L-cysteine hydrochloride, glutathione and sodium bisulfite. These compounds are sulfur-containing type reducing agents which are nontoxic and which do not form any toxic or otherwise objectionable byproducts with other ingredients in the mix. As pointed out in Henika et al. U.S. Pat. No. 3,053,666, these activating agents have no detrimental effect on flavor, nutrient value, or other essential properties of the final product. Satisfactory activating agents according to the invention include compounds related to or homologous with L-cysteine hydrochloride and D and DL cysteine hydrochloride, the free bases of L and D and DL cysteine, L-cysteine monophosphate, di-L-cysteine sulfate and L-monocysteine tartrate. Homocysteine is likewise related to the foregoing compounds and can be used. Various sulfite salts, such as potassium bisulfite and sodium or potassium sulfite can be used in place of sodium bisulfite. Related compounds such as hydrosulfite and pyrosulfite salts may also be employed. Natural foods such as inactive dry yeast, unheated soy flour, etc., may also be used as sources of cysteine and/or glutathione, as likewise disclosed in Henika et al. U.S. Pat. No. 3,053,666.

In general, the activating agents are employed in the prepackaged mix at a level to obtain dough viscosities on mixing with the water, in either steps 12 or 28, which will insure that the working or kneading of the dough can be accomplished with relatively little effort and in a very short time. More specifically, the activating agents are employed in proportions which are directly related to the amount of protein present in the dough. Accordingly, to avoid the necessity of unusually high levels of activating agent, it has been found desirable to employ a cereal flour, or flours, which have an optimum protein level ranging from about 8 to 12 percent on the weight of the flour. We have found that a flour having a protein content within the range specified can be effectively processed with amounts of activating agents in the mix, ranging from about 0.005 to 0.014 percent on the weight of the flour. In practice, a cereal flour can be readily milled by commercially available procedures, to obtain a flour of desired predetermined protein content. Alternatively, cereal flours of known protein content can be mixed in predetermined portion to obtain a blend of cereal flours having an average protein content within the desired range. By way of specific illustration, a bread flour having an average protein content of 12 percent can be mixed with approximately 3 times its weight of a pie and cookie flour having an average protein content of about 9.3 percent. The resulting blend or mixture of the cereal flours will have a protein content closely approximating 10.0 percent, on the weight of the flour. Incorporation of a biochemical activating agent such as L-cysteine hydrochloride into such a flour, in a proportion of about 0.010 percent on the weight of the flour, cooperates in the ready-mix processing heretofore described to provide a mixed dough with desired dough consistencies for home baking processes as determined by the ease of kneading and working the dough to a smooth, pliable state. In general, a dough which is smooth and satiny, with essential springiness, evidences a desired degree of dough development and extensibility.

As gluten maturing agents in our dry premixes, we prefer to employ azodicarbonamide, potassium bromate, calcium bromate, calcium peroxide, potassium sulfate, and mixtures of these ingredients. The maturing agents are generally employed at levels ranging from 0.001 to 0.013 percent on the weight of the flour present in the mix, dependent to some extent on the particular flour employed, the product being produced and the proportions of the other ingredients in the dry mix.

We have additionally found that in the home baking process, it is important to prevent reactions between the activating and maturing agents, particularly during the dough mixing steps, which will reduce the effectiveness of the gluten activating agents, as described above. Whereas such reactions might be counteracted in commercial bakery processes by the more powerful mixing equipment available to the commercial baker, such flexibility in processing is not possible in the home, nor is it desirable to expect or to require the housewife to provide the additional muscle or mixing power for such purpose. Accordingly, we have found it desirable to employ certain delayed-action type maturing agents in the mix, as represented by azodicarbonamide. A particularly satisfactory maturing agent for use in the described process, comprises a mixture of azodicarbonamide with a more conventional maturing agent (e.g., potassium bromate) for example, containing two-third potassium bromate and one-third azodicarbonamide. The described maturing agent, by delaying slightly the dough maturing reactions during dough development and proof, enables the activating agents to more rapidly and effectively achieve dough consistencies for ease of kneading and working of the dough in the ready-mix or home process.

In formulating the ready-mix doughs, we also prefer to employ dry whey solids in place of the customary use of dry nonfat milk solids. However, nonfat milk solids, dry soybean solids, or equivalent materials might be satisfactorily employed. With respect to the whey product, any commercially available whey powder such as whey resulting from the manufacture of cheddar, swiss, and/or cottage cheese may be employed. It has been found that whey in conjunction with the activating agents provides broader ranges of developing and maturing conditions, thus providing greater tolerance to the variation in processing conditions normally encountered in a home baking procedure. Whey also assists in obtaining extensibility and proper consistency in the home mix.

For purposes of illustration, the following table sets forth the optimum ranges of activating agents together with a combined bromate and azodicarbonamide maturing agent, which can be incorporated with the flour in a prepackaged dry mix, expressed as a percent of the flour.

| Dough additive | Operable range percent of flour |
| --- | --- |
| Cysteine HCl | 0.005 to 0.014 |
| Potassium bromate | 0.001 to 0.013 |
| Azodicarbonamide | 0.0005 to 0.005 |
| Glutathione | 0.005 to 0.014 |
| Potassium bromate | 0.001 to 0.013 |
| Azodicarbonamide | 0.0005 to 0.005 |
| Sodium bisulfite | 0.005 to 0.013 |
| Potassium bromate | 0.001 to 0.013 |
| Azodicarbonamide | 0.0005 to 0.005 |

It should be noted that bromate is customarily used in flour milling, and that flours may normally contain about 0.0001 to 0.0005 percent potassium bromate. The yeast food employed in the prepackaged mix may also contain additional amounts of bromate whereby as much as 0.0025 percent potassium bromate may be ordinarily contributed by the flour and yeast food in a prepackaged mix. This amount of additional bromate is not included in the amounts specified in the above table.

While not essential, it is preferable to use the dry whey solids as a means to incorporate the activating agent in the dry premix. As noted in the above table, the activating agent constitutes a very small portion of the ingredients making up the dough mixture, constituting only 0.005 to 0.014 percent of the total. It will be appreciated that effective distribution of such a small amount of the activating agent throughout the ingredients, in a prepackaged mix is the homogenous distribution of the small amount of activating agent throughout the ready-mix ingredients. It also makes possible the uniform flow We have found, however, that a particularly homogenous distribution of the activating agent can be obtained by use of dry whey solids having a particle size (between 70 and 260 microns) specially adapted for use in the premix. We have further found that the activating agent itself can have a particle size (between 90 and 260 microns) which enables it to be homogenously distributed throughout the dried whey. The use, as herein described, of intermixed activating agent and dry whey solids in a specially prepared homogenous form makes possible the uniform flow and metering of such ingredient for purposes of accurate continuous measurement in factory operations to incorporate the various dry ingredients in the final package.

As respects the whey, one procedure which can be employed to prepare a whey powder having desired characteristics as to particle size is disclosed in Peebles et al. U.S. Pat. No., 2,575,119. As disclosed in this patent, a liquid suspension of whey can be atomized in the presence of hot drying gases to produce a finely divided dry powder. The resulting dry powder has a particle size distribution which is particularly adapted to be used in the present invention, such particle size distribution, as determined by screening according to the U.S. Standard Sieve Series, is as follows:

| U.S. Standard Sieve Series | Proportion of particles transmitted by sieve, in % |
| --- | --- |
| 420 micron | At least 98% |
| 210 micron | At least 45% |
| 74 micron | Not more than 55% |
| 53 micron | Not more than 10% |

As above indicated, dry whey solids in the preferred form will have a particle size distribution of not more than 2 percent on a 420-micron sieve, at least 45 percent through a 210-micron sieve but retained on a 74-micron sieve, and not more than 10 percent through a 53-micron sieve. In addition the dry whey powder must have a loose-fill density between 0.56 and 0.63 grams per ml.

In like fashion, the activating agent can be similarly processed to provide a particle size distribution, as determined by screening, according to U.S. Standard Sieve Series, as follows:

| U.S. Standard Sieve Series | Proportion of particles transmitted by sieve, in % |
| --- | --- |
| 420 micron | At least 98% |
| 210 micron | At least 50% |
| 74 micron | Not more than 50% |

| | |
|---|---|
| 53 micron | Not more than 10% |

The activating agent in this form will likewise be a dry powder having a particle size distribution of not more than 2 percent on a 420-micron sieve, at least 50 percent through a 210-micron sieve, but retained on a 74-micron sieve, with not more than 10 percent through a 53-micron sieve. In addition, the dry powdered activating agent must have a loose-fill density between 0.50 and 0.66 grams per ml. to ensure a desired degree of homogenity with the whey powder.

The powdered activating agent, such as cysteine, can be incorporated with the dry whey powder by any suitable dry mixing procedure, for example in a stream of gas by dry tumbling or other procedure adapted to provide a homogenous distribution of the activating agent and dry whey powder. Assuming use of dry whey powder intermixed with powdered activating agent in a prepackaged mix (and both components having a comparable particle size distribution) we have found that the activating agent should be distributed within the dry whey in the approximate proportions of 0.2 percent to 0.6 percent by weight of activating agent and, correspondingly, 99.4 percent to 99.8 percent dry whey powder. Home dough formulations, as a rule, are not critical with respect to amounts of milk solids; consequently, dried whey powder can be conveniently employed for purposes of distributing the activating agent throughout the dry mix, in the manner heretofore described.

In our home baking process, certain advantages are also to be obtained through use of starch modifying agents which, as previously noted, tend to improve dough characteristics and the flavor of the final product. Agents satisfactory for this purpose include members of the group of monoglycerides, diglycerides, ethoxylated monoglycerides, ethoxylated diglycerides, fatty acid esters of lactic acid, and mixtures of these agents. Where the fatty acid esters of lactic acid are used as the starch modifying agents, we have found that best results are obtained with esters having 16 to 18 carbon atoms in the chain. While the chemical reactions related to the starch modifying agents are not clearly understood, they are believed to involve complex reactions with the starch molecules in the flour which effect a desirable reorientation of the long chain molecules in the starch complex. Physically, these starch reactions tend to effect changes in the characteristics of the dough during the periods of gas evolution which insure desired grain and crumb textures in the baked product. In bread, the grain quality is less coarse, whereas the crumb texture is less cohesive, providing a more desirable eating texture. Even more important is a decided improvement realized in the flavor of the baked product, a result not to be expected in a home process wherein the dough receives a much lower level of development than in the commercial bakery. Apparently, the complexing reactions with the starch molecules are somehow associated with reactions which tend to enhance the flavor of an incompletely developed dough.

As a practical matter, we have found that the described starch modifying agents are effective when used in a proportion ranging from about 0.15 to 0.5 percent by weight of the flour. When used within this range, we have found that the starch modifying agents tend to assist in the control of gas evolution in a ready-mix dough preparation wherein all the ingredients are mixed in a single step (i.e., without any preliminary brew step). While this further function of the starch modifying agents is again not clearly understood, it is also believed to be associated with a complexing between the long chain starch molecules and the modifying agents, in a dough having a relatively low order of development.

As is well known, yeast performs a vital function in any process for making yeast-leavened products such as bread, rolls and the like, performing a number of different and important functions. Apart from contributing to the flavor and aroma of the bread, yeast fermentation is generally relied upon to effect a rate of carbon dioxide production that is high and relatively constant, to insure good loaf volumes as well as uniform grain structure. We have found, however, in the home baking processes herein described, that the leavening functions of yeast in the dough can be largely replaced or supplemented through use of chemical leavening agents. Particularly satisfactory reagents for this purpose include monocalcium phosphate (monohydrate and anhydrous), sodium aluminum phosphate, sodium acid pyrophosphate, as well as mixtures of these agents with sodium bicarbonate. In prepackaged mixes suitable for home baking processes, systems of chemical leavening agents which provide a delayed leavening action are generally to be preferred, as they assist in providing tolerance to variations in mixing procedure of the type likely to be encountered in the home environment. Examples of suitable delayed action type leavening agents include sodium aluminum phosphate, alone, or in blends with monocalcium phosphate (monohydrate or coated anhydrous). The delayed action of the sodium aluminum phosphate leavening agents is primarily due to the relatively slow solubility of these reagents in water. Moreover, by varying the ratio of phosphorus (acidic) and aluminum (basic) and sodium (basic), various complexes of a sodium aluminum phosphate can be formed to provide a range of reaction properties for particular types of prepackaged or prepared mixes. In general, the sodium aluminum phosphates release about 20 percent of their carbon dioxide gas potential during the initial mixing period, with the remaining 80 percent of leavening gas potential being retained in the dough until the dough is exposed to proofing or baking temperatures (e.g., 120° F. or more). In like fashion, delayed leavening action can be accomplished by coating of the chemical leavening agents with heat responsive coating such as heat sensitive waxes and the like. The temperature at which the retained leavening gas is released can also be varied by the choice of leavening agent. For example sodium acid pyrophosphate releases its retained gas at about 95° F., whereas dicalcium phosphate dihydrate releases at about 140° F.

The chemical leavening agents are used advantageously with proportionate amounts of yeast, thereby retaining the desired flavor characteristics of the yeast as well as some of the leavening characteristics. By way of illustration, the use of sodium aluminum phosphate in conjunction with sodium bicarbonate permits an approximate 50 percent reduction in the yeast level with concurrent advantages. Specifically, the combined use of yeast with chemical leavening provides increased tolerance to variations in flour and other ingredients in the mix, and to the wide range of variations in housewives's methods of handling and use. Use of the described chemical leavening agents also tends to prolong the shelf life of the prepackaged mix.

The features and advantages of the home baking processes described herein are further demonstrated by the following examples which generally demonstrate ready-mix formulations and procedures adapted to use in home processes, as hereinbefore particularly described in conjunction with FIGS. 1 and 2. In these examples, all concentrations of ingredients are expressed as percent of the flour.

EXAMPLE 1—LABORATORY BAKING TEST

| | Dough Formula Grams | Percent |
|---|---|---|
| Flour (pie and cookie—9.3% protein) | 600 | 100 |
| Sugar | 30 | 5 |
| Dextrose | 6 | 1 |
| Salt | 12 | 2 |
| Yeast (active dry) | 24 | 4 |
| Yeast Food | 3.6 | 0.6 |
| Shortening | 6 | 1 |
| Dried Whey | 12 | 2 |
| L-cysteine-hydrochloride | 0.0600 | 0.010 |
| Potassium Bromate | 0.0365 | 0.005 |
| Azodicarbonamide | 0.0183 | 0.0025 |

Mixing and Baking Procedure

1. The yeast is mixed with the 1¾ cups of warm water (105° F.) in a mixing bowl, and blended by stirring. About one cup of the remaining dry ingredients, prepackaged as a dry mix, is added to the water and blended with stirring to provide a slightly lumpy mixture. This mixture is set aside and allowed to ferment for at least 15 minutes.
2. The remaining dry ingredients are mixed with the fermented yeast blend, and the mixture blended until the bowl is clean.
3. The freshly mixed dough is turned out onto a dough board, previously floured with an all-purpose flour, and kneaded steadily for about 3 minutes. The dough is generally smooth, springy and satiny.
4. With greased hands, the dough is divided into two pieces, and each is shaped and placed in a baking pan.
5. The pans are placed in the oven at the lowest temperature setting (e.g., about 140° F.), leaving the door cracked open. The dough is allowed to rise for about 30 minutes, until the center of the dough is about 1 inch above the edge of the pan.
6. The oven door is closed and the loaves baked 30 to 35 minutes with the oven thermostat at 400° F. (e.g., oven temperature about 375° to 425° F.). Alternatively, the loaf is baked until uniformly brown.
7. Loaves are turned out of the pans onto a rack, or placed crosswise on top of the pans, and cooled to room temperature.

Results

Two loaves of satisfactory bread, comparable to commercial bread are obtained by the preceding process in approximately 80 to 90 minutes. The symmetry and crust color of the loaves is excellent. The texture is typical of conventional homemade bread with slightly open grain and taste and aroma representative of yeast fermentation.

EXAMPLE 2—COMMERCIAL BAKING TEST WITH BREW STEP

| Dough Formula | Percent |
|---|---|
| Flour: | |
| Pie and cookie—9.3% protein | 75.0 |
| Bread—11.8% protein | 25.0 |
| Sugar | 5.0 |
| Dextrose | 1 |
| Salt | 2 |
| Yeast (active dry) | 3.5 |
| Yeast Food | 0.6 |
| Shortening | 2 |
| Monocalcium phosphate | 0.3 |
| Homogenous dried whey product[1] | 2.490 |
| L-cysteine-hydrochloride from whey product[1] | 0.010 |
| Potassium bromate | ** 0.005 |
| Azodicarbonamide | 0.0025 |

1 Homogenous distribution of 99.6% dried whey (particle size between 70 and 260 microns) and 0.4% L-cysteine-hydrochloride (particle size between 90 and 260 microns).

Procedure

The same as in example 1 except for the prepackaging of ingredients as follows:

a. Premix package (9 3/4 inch by 5 1/8 inch by 3 9/16 inch) containing one heat sealed bag of ready-mix dried ingredients (670 grams) in which the dried whey/cysteine product is distributed throughout as a homogenous blend, together with one packet of active dry yeast (21.0 grams) and 2 aluminum bread pans.

b. One No. 6 paper bag enclosing two packets of heat sealed dry ingredients in ready-mix form (335 grams each), together with two packets of active dry yeast (10.5 grams each).

The foregoing packaging provides the housewife with ready-mix ingredients for mixing and baking of two standard loaves of bread in the home.

Results

The finished loaves have volumes and grain quality equal to or better than homemade bread. The taste and aroma of the bread is excellent with desirable fermentation overtones. The toasting quality is good.

EXAMPLE 3—COMMERCIAL BAKING TEST WITH ONE-STEP MIXING

| Dough Formula | Percent |
|---|---|
| Flour: | |
| Pie and cookie—9.3% protein | 75.0 |
| Bread—11.8% protein | 25.0 |
| Sugar | 5.0 |
| Dextrose | 1 |
| Salt | 2 |
| Yeast (active dry) | 3.5 |
| Yeast Food | 0.6 |
| Shortening | 2 |
| Ethoxylated monoglyceride | 0.3 |
| Monocalcium phosphate | 0.3 |
| Homogenous dried whey product[1] | 2.490 |
| L-Cysteine-hydrochloride from whey product[1] | 0.010 |
| Potassium bromate | 0.005 |
| Azodicarbonamide | 0.0025 |

1 Homogenous blend of dried whey and L-Cysteine-hydrochloride as in example 2.

Procedure

The ingredients are prepackaged as in example 2. However, a one-step mixing procedure is employed as follows:

a. All of the prepackaged dry ingredients are mixed together with 1½ cups of warm water (105° F.), and the ingredients blended by hand, or with an electric mixer at low speed, for 1 or 2 minutes, or until the bowl is clean.

b. Using a dough board which has been sparingly dusted with an all-purpose flour, the mixed dough is turned out and kneaded steadily for about 3 minutes—to produce a mixed dough which is generally smooth and pliable.

c. The dough is divided and placed in baking pans and oven proofed at the lowest temperature setting (e.g., about 110° to 140° F.). The dough is allowed to rise for about 35 to 45 minutes until the center of the dough is at least 1 inch above the edge of the pan.

d. The bread is baked in the oven at 400° F. for 30 to 35 minutes, or until the loaf is uniformly brown.

e. The loaves of bread are turned out of the pans and cooled, in conventional manner.

Results

The development and consistency of the dough prior to dividing and placing in the pans is quite good, considering the absence of any substantial yeast fermentation period. The dough rises normally during proofing, and the baked products exhibit normal loaf volume, symmetry and grain quality with excellent eating characteristics. Crumb color is also very good, the flavor excellent.

The total time from the start of mixing to the removal of the bread from the oven is 80 to 85 minutes, compared to conventional home baking times under the same conditions and with the same equipment of approximately 5 hours.

EXAMPLE 4—COMMERCIAL BAKING TEST WITH CHEMICAL LEAVENING

| Dough Formula | Percent |
| --- | --- |
| Flour: | |
|   Pie and cookie—9.3% protein | 75.0 |
|   Bread—11.8% protein | 25.0 |
| Sugar | 5.0 |
| Dextrose | 1 |
| Salt | 2 |
| Yeast (active dry) | 1.7 |
| Yeast Food | 0.6 |
| Shortening | 2 |
| Ethoxylated monoglyceride | 0.3 |
| Homogenous dried whey product[1] | 2.490 |
| L-Cysteine-hydrochloride from whey product[1] | 0.010 |
| Potassium bromate | 0.005 |
| Azodiacarbonamide | 0.0025 |
| Bicarbonate of soda | 1 |
| Sodium aluminum phosphate | 2 |

[1] Homogenous blend of dried whey and L-cysteine-hydrochloride as in example 2.

Procedure

The procedure is the same as in example 3. The prepackaged dry mix (650 grams for two loaves) is initially mixed with 1½ to 1¾ cups of water.

Results

The dough and bread properties are substantially the same as obtained in example 3, being equal or superior to commercial bread. The total time, from start of mixing to removal of the loaves from the oven is 80 to 85 minutes.

To those skilled in the art to which this invention relates, many different applications and embodiments of the invention will suggest themselves without departing from the spirit and scope of the invention. In general, however, we have determined that the process disclosed herein can be satisfactorily employed in producing most any type of bakery product. For example, it can be satisfactorily employed in home baking processes for white bread; variety bread such as whole wheat, rye, raisin, honey-nut, etc.; crackers, such as soda crackers; specialty products such as pizza breads and doughs; sweet goods such as raisin and cinnamon rolls, Danish rolls; coffee cakes; leavened doughnuts; and, in fact, virtually all types of leavened bread, buns and rolls.

The above examples were chosen to illustrate the essential processing to be employed in a home baking process, under somewhat differing conditions of formula and mixing procedure. It is not practical or feasible to illustrate all possible variations by way of specific example, and the disclosures and descriptions herein should consequently be considered as merely illustrative and not in any sense limiting.

We claim:

1. A home process for making leavened bakery products consisting essentially of the steps of isolating in substantially dry form essential dough ingredients including flour, yeast, and flavoring, the protein content of said flour being within the range from 8 to 12 percent by weight, at least a part of said dough ingredients additionally including about 0.005 to 0.014 percent by weight of the flour of a gluten activating agent selected from the group consisting of cysteine, glutathione and sulfite salts and mixtures thereof, mixing the dry dough ingredients including the activating agent with water to form a dough, said activating agent being present in an amount sufficient to react with substantially all the protein in the dough to achieve desired dough viscosities with minimal working and mixing as determined by characteristics of dough development and extensibility, at least part of said dough ingredients additionally including about 0.001 to 0.13 percent by weight of the flour of a gluten maturing agent selected from the group consisting of azodicarbonamide, bromate and persulfate oxidizing salts and mixtures thereof, kneading the dough for a relatively short period of the order of about ½ to 8 minutes to render the same smooth and pliable, forming at least a part of the kneaded dough into a unit for baking, and thereafter subjecting the formed unit to a single dough rising step followed by baking to produce a baked product.

2. A process as in claim 1 wherein the yeast is initially mixed with the water prior to mixing to form the dough.

3. A process as in claim 1 wherein the formed dough is allowed to rise, prior to baking, for a period of about 25 to 45 minutes.

4. A rapid, ready-mix process for making high quality leavened bakery products in less than about 90 minutes consisting essentially of the steps of isolating in substantially dry form essential dough ingredients including flour, sugar and yeast, the protein content of said flour being within the range from 8 to 12 percent by weight of the flour content, at least a part of said dough ingredients additionally including about 0.005 to 0.014 percent by weight of the flour of a gluten activating agent selected from the group consisting of cysteine, glutathione and sulfite salts and mixtures thereof and about 0.001 to 0.013 percent by weight of the flour of a gluten maturing agent selected from the group consisting of azodicarbonamide, bromate and persulfate oxidizing salts and mixtures thereof, mixing the dry dough ingredients including the activating and maturing agents with sufficient water to form a dough, said activating agent being present in an amount sufficient to react with substantially all the protein in the dough to achieve desired dough viscosities with minimal working and mixing as determined by characteristics of dough development and extensibility, kneading the freshly mixed dough for a relatively short period of time ranging from about ½ to 8 minutes to render the same smooth and pliable, forming at least a part of the kneaded dough into a unit for baking, subjecting the formed unit to a single dough rising step of 25 to 45 minutes duration, and baking the formed unit to produce a baked product.

5. A process as in claim 4 wherein the water is at a temperature within the range from 85° to 120° F. at the time of mixing with the dry ingredients.

6. A process as in claim 4 wherein the yeast is initially mixed with the water to form a brew and allowed to ferment for a period of the order of 15 minutes.

7. A process as in claim 4 wherein the dough is kneaded for no more than about 3 minutes.

8. A process as in claim 4 wherein the dough rising step is carried out at a temperature of about 85° to 140° F.

9. A process as in claim 8 wherein the dough units are baked at 375° to 425° F. for a period of 30 to 40 minutes.

10. A home process for making high quality leavened bakery products in less than 90 minutes consisting essentially of the steps of isolating in substantially dry form essential dough ingredients including cereal flour, sugar and yeast, the protein content of said flour being within the range from 8 to 12 percent by weight of the flour content, at least a part of said dough ingredients additionally including about 0.005 to 0.014 percent by weight of the flour of a gluten activating agent selected from the group consisting of cysteine, glutathione and sulfite salts and mixtures thereof and about 0.001 to 0.013 percent by weight of the flour of a gluten maturing agent selected from the group consisting of azodicarbonamide, bromate and persulfate oxidizing salts and mixtures thereof, mixing the dry dough ingredients including the activating and maturing agents with sufficient water to form a dough, kneading the dough for no more than about 3 minutes to render the same smooth and pliable, forming the dough into one or more units for baking, subjecting the formed units to a single dough expanding step at 85° to 140° F. for about 25 to 45 minutes, and baking the expanded dough units at 375° to 425° F. for a period of 30 to 40 minutes.

11. A process as in claim 10 wherein said dough ingredients include 0.15 to 0.5 percent by weight of the flour of a starch modifying agent selected from the group consisting of monoglycerides, diglycerides, ethoxylated monoglycerides, ethoxylated diglycerides, fatty acid esters of lactic acid, and mixtures thereof, said starch modifying agent serving to improve the flavor of the final baked product.

12. A process as in claim 10 wherein the flour is obtained by specially milling cereal grains to provide a cereal flour having a protein content with the desired range of 8 to 12 percent.

13. A process as in claim 10 wherein the flour is obtained by mixing cereal flours of varying protein content to provide a cereal flour having a protein content within the desired range of 8 to 12 percent.

14. A rapid process for making leavened bakery products, suitable for use in the home consisting essentially of the steps of mixing a quantity of yeast and other dry ingredients with water at a temperature within the range of 85° to 120° F., allowing the resulting mixture to ferment for a period of at least 15 minutes to provide a yeast brew, mixing said yeast brew with essential dough ingredients including cereal flour, about 0.005 to 0.014 percent by weight of the flour of a gluten activating agent selected from the group consisting of cysteine, glutathione sulfite salts and mixtures thereof, about 0.001 to 0.013 percent by weight of the flour of a gluten maturing agent selected from the group consisting of azodicarbonamide, bromate and persulfate salts and mixtures thereof, and about 0.15 to 0.5 percent by weight of the flour of a starch modifying agent selected from the group consisting of monoglycerides, diglycerides, ethoxylated monoglycerides, ethoxylated diglycerides, fatty acid esters of lactic acid and mixtures thereof, to form a dough, the protein content of said flour being within the range from 8 to 12 percent by weight of the flour content, kneading the resulting mixed dough for a relatively short period of the order of about ½ to 8 minutes to render the same smooth and pliable, forming the dough into one or more units for baking, subjecting the same to a single proofing step at 85° to 140° F. for a period of 25 to 45 minutes, and thereafter baking the proofed dough units at 375° to 425° F. for a period of 30 to 40 minutes, the entire time for said process being less than about 90 minutes.

* * * * *